May 30, 1944.   L. MAZZONI   2,349,977
COMB MOLD
Filed March 18, 1941   2 Sheets-Sheet 2
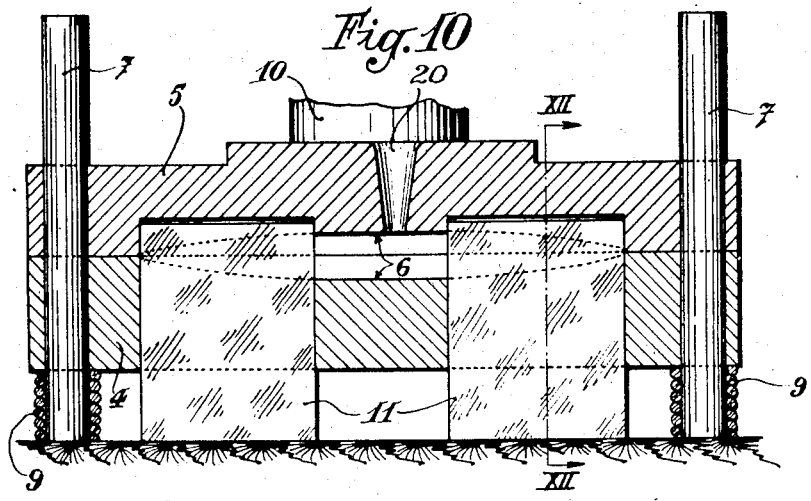
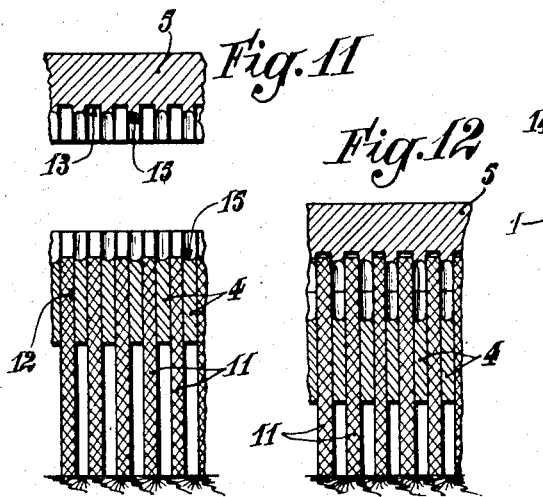
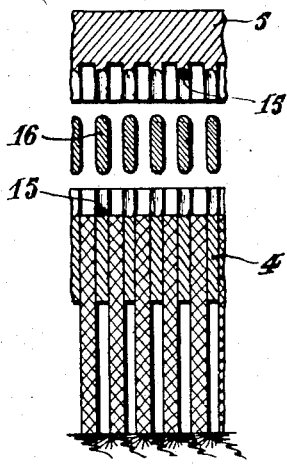
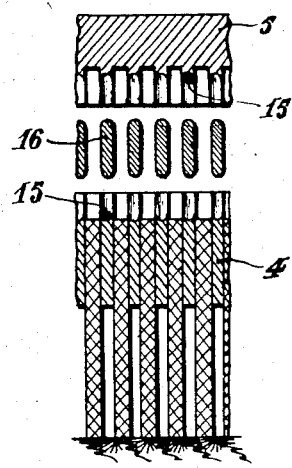
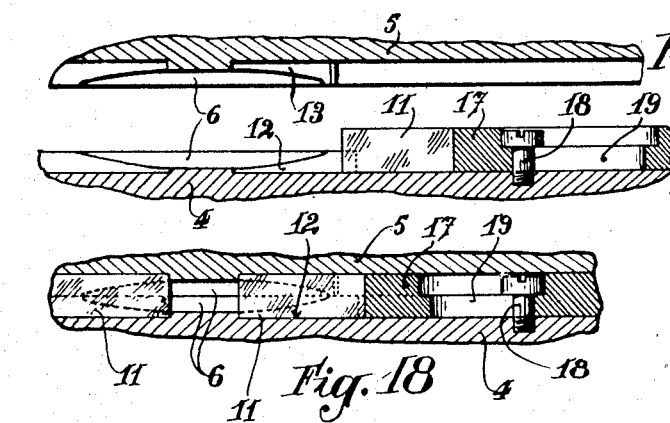
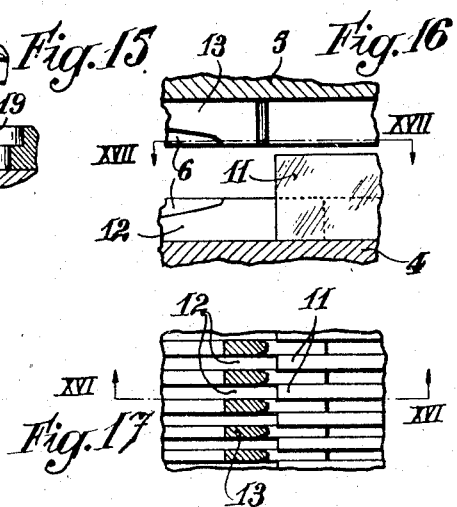
INVENTOR:
Lucien Mazzoni
By Alexander Dowell
ATTORNEYS Patented May 30, 1944

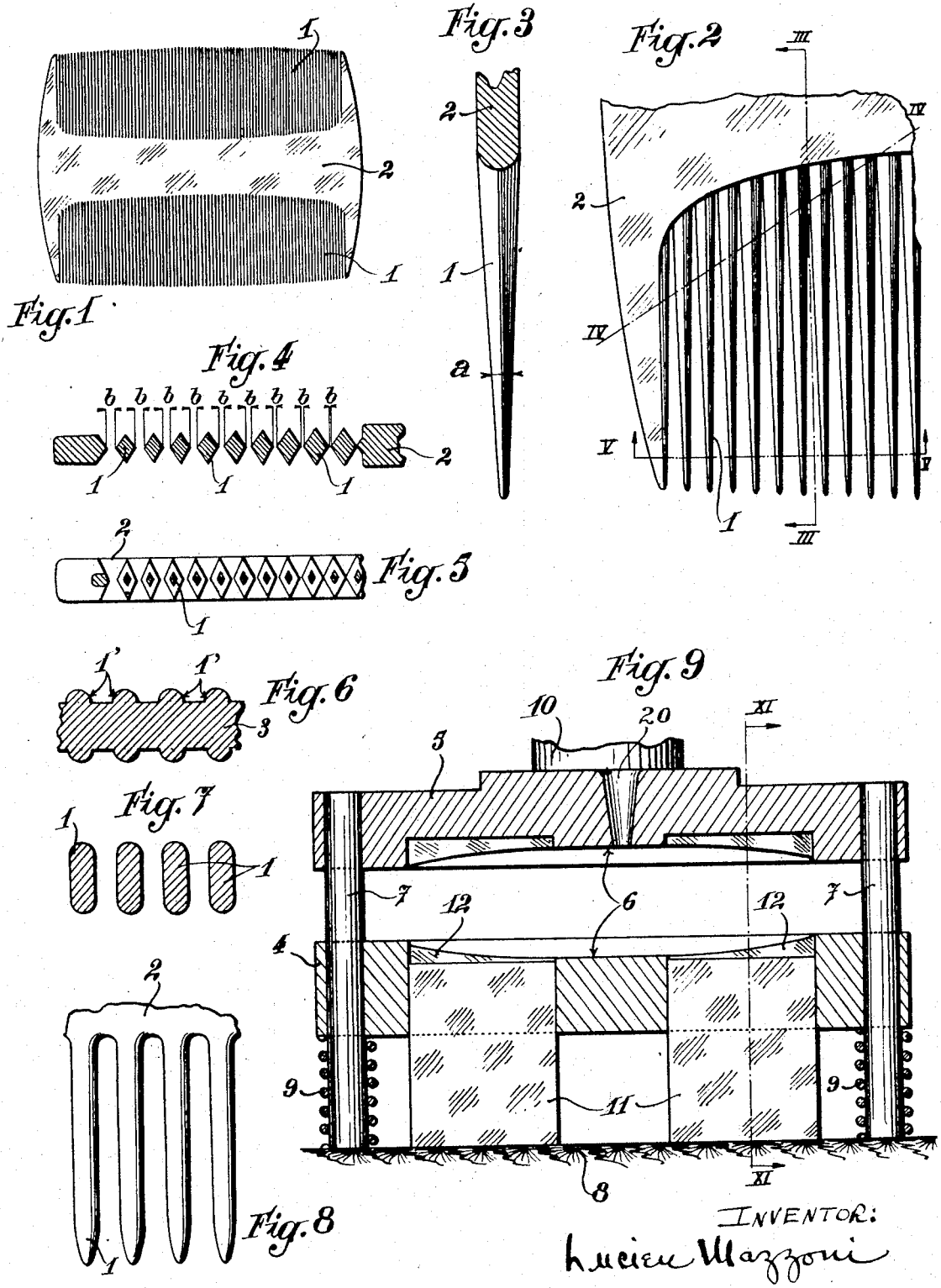

2,349,977

UNITED STATES PATENT OFFICE 2,349,977

COMB MOLD

Lucien Mazzoni, Lyon, France; vested in the Alien Property Custodian

Application March 18, 1941, Serial No. 384,011
In France March 19, 1940

9 Claims. (Cl. 18—42)

My invention relates to the manufacture of combs from plastic or artificial materials such as cellulose derivatives or artificial resins.

Combs are usually made from such materials by molding. In the cheaper articles, the teeth are directly obtained by molding without any subsequent operation, while in other cases the teeth are cut out in a molded blank. In the teeth obtained by molding the intermediate spaces decrease in width from the tip to the bottom, which is an inconvenience for the user. This is avoided with teeth obtained by cutting, but the cutting operation materially increases manufacturing costs.

A first object of my invention is to provide combs obtained by molding without any subsequent operation, and wherein the spaces between the teeth are regular in width from tip to bottom.

Another object of my invention is to provide a method of molding combs from plastic or artificial materials, wherein the spaces between the teeth are obtained by means of blades engaged through the mold which are removed before the mold is opened.

A further object of my invention is a molding device for combs of plastic or artificial materials comprising a mold having a bottom supported by elastic means on a base provided with vertical blades partially engaged through the said bottom in such a manner that when the top of the mold is pressed on the bottom, the said blades are driven through the mold and are afterwards removed when the pressure of the top on the bottom is released.

In the annexed drawings:

Fig. 1 shows a comb molded according to the known methods without finishing operation.

Fig. 2 is an enlarged partial view thereof.

Figs. 3, 4 and 5 are sections thereof taken along lines III—III, IV—IV and V—V (Fig. 2).

Fig. 6 is a partial section of a blank obtained by molding in the known methods of manufacture involving a cutting operation.

Fig. 7 is a similar section showing the cross-section of the teeth obtained from such a blank by cutting.

Fig. 8 is an enlarged partial view of the comb obtained.

Fig. 9 is a longitudinal section of a molding device according to my invention.

Fig. 10 is a view similar to Fig. 9, but the top being pressed on the bottom.

Figs. 11 and 12 are partial sections taken on lines XI—XI and XII—XII of Figs. 9 and 10.

Figs. 13 and 14 are partial sections similar to Figs. 11 and 12, but showing the parts respectively when the pressure of the top on the bottom is released and when the molded comb is disengaged from the mold.

Fig. 15 is a partial section of a modified mold at the open position.

Fig. 16 shows on an enlarged scale a portion of Fig. 15.

Fig. 17 is a section taken on line XVII—XVII of Fig. 16.

Fig. 18 is a view similar to Fig. 15, but at the closed position of the mold.

Figs. 1 to 5 show a comb with two opposed series of teeth 1 fixed to the same back 2. This comb is directly obtained by molding according to the known methods. As it is well known, the mold is made of two parts, the plane of the comb being coincident with the plane of the joint of the said parts.

In order to avoid breakage of the teeth when the mold is being opened, it has been customary to give the teeth a cross-section more or less similar to a lozenge, as clearly shown in Figs. 4 and 5. Since the thickness $a$ (Fig. 3) of a tooth increases from the tip to the bottom, where it equals the thickness of the back 2, the dimensions of the cross-sectional lozenge also increase, as shown by Fig. 4 which corresponds to a line of section IV—IV (Fig. 2) inclined with respect to the back. The width $b$ of the intermediate space between two consecutive teeth 1 therefore decreases from tip to bottom as shown in Figs. 2 and 4, and with long and fine teeth said space may vanish in the vicinity of the back.

When using such a comb, the hair may be pinched in the narrower portions of the intermediate spaces. This kind of comb is therefore unsatisfactory.

The better combs are generally made by cutting the teeth in a molded blank. Fig. 6 shows the cross-section of such a blank wherein the teeth are not wholly formed and appear as ridges 1' on both faces of a plain plate 3. The teeth are then finished by cutting by means of rotary cutters or the like and they finally appear as indicated in Figs. 7 and 8. The width $b$ of the intermediate spaces between the successive teeth is regular from tip to bottom. The comb obtained is satisfactory, but its cost of manufacture is high owing to to the cutting operation which besides necessitates a subsequent polishing.

According to my invention combs similar to Figs. 7 and 8 are directly obtained by molding without any subsequent finishing operation.

The mold illustrated in Figs. 9 and 11 comprises a bottom 4 and a top 5 provided with appropriate recesses 6 adapted for mutual cooperation to mold a comb of the kind shown in Fig. 1, but without any intermediate space between the teeth, i. e. the mold formed by bottom 4 and top 5 when superimposed would produce a plain plate having the shape and the thickness of the comb of Fig. 1.

Bottom 4 is guided by vertical rods 7 fixed to a horizontal base or support 8 and it is elastically supported thereon by springs 9 disposed around rods 7. Top 5 is also guided by rods 7 and it is fixed to a vertically movable member 10 which may be, for instance, the movable head of a molding press.

Base 8 carries two rows of blades 11 disposed in equidistant parallel relation, the upper part of each blade being engaged into a corresponding slit 12 provided through bottom 4 and the said blades being so proportioned that at the open position of the mold (i. e. when the top 5 is raised above bottom 4 as shown in Fig. 9) they do not project in the corresponding recess 6. Top 5 is also provided with blind slits to accommodate the upper ends of blades 11 when the said top is lowered as indicated in Figs. 10 and 12.

Blades 11 are so disposed as to correspond with the intermediate spaces to be obtained between the successive teeth of the comb.

The operation is as follows:

Top 5 is first pressed down on bottom 4. Springs 9 are compressed (Fig. 10) and bottom 4 is lowered whereby blades 11 move upwardly with respect to the mold. They project from bottom 4 and penetrate into slits 13 (Figs. 10 and 12).

The plastic material or molding composition is then introduced into the mold under pressure through gate 20 in the well-known manner. It is hardened in the mold by cooling, by polymerization or by any other appropriate means.

The mold is then opened by raising top 5. At first, springs 9 maintain bottom 4 pressed against top 5, the mold being raised as a whole, whereby blades 11 move downwardly with respect to the mold (Fig. 13) leaving void spaces 14 between the successive molded teeth 1. The latter being firmly maintained between parts 4 and 5, there is no risk of breakage of the teeth.

Top 5 being further raised (Fig. 14) the mold is opened and the molded comb can be removed and used without requiring any subsequent finishing operation.

The plain intermediate portions of the mold between slits 12 and 13 are preferably concave as shown at 15 (Figs. 11 to 14), whereby the cross-section of the teeth is rounded as indicated at 16 (Fig. 14).

In the modification of Figs. 15 to 18 the blades 11 are movable horizontally. The bottom part 4 of the mold need not be elastically supported on the press base.

Blades 11 are fixed to a transverse member 17 guided on bottom 4 by screws 18 passed through elongated slits 19 of bottom 4. Bottom 4 and top 5 are provided with slits 12 and 13 adapted for cooperation with blades 11.

The mold is first closed as shown in Fig. 18 and blades 11 are pushed towards the molding recesses 6 through slits 12 and 13. The molding composition is introduced into the mold and hardened. Blades 11 are then disengaged and the mold is opened.

It will be understood that although the invention has been described with reference to a comb having two rows of teeth, it may also be applied to the manufacture of combs with but one series of teeth. Also the spacing of the teeth may be regular or irregular.

I claim:

1. A molding device for the manufacture of combs from plastic materials and the like comprising an openable mold having a recess and a gate thereto into which plastic material is forced under pressure to mold a blank having the contour and thickness of the comb to be obtained, said mold also having a plurality of substantially parallel slits opening outwardly of the mold; and a plurality of blades, each of said blades being adapted to slide longitudinally through one of said slits and across the plane of the recess.

2. A molding device as claimed in claim 1, wherein the mold is in two parts, the plane of the juncture of said parts being coincident with the mean longitudinal plane of the comb to be obtained.

3. A molding device as claimed in claim 1, wherein the blades are movable perpendicularly with respect to the mean longitudinal plane of the comb to be obtained.

4. A molding device for the manufacture of combs from plastic materials and the like comprising a bottom portion having a molding recess on its upper face and a plurality of substantially parallel slits opening outwardly of the said bottom portion; a top portion adapted to be pressed on said bottom portion, said top portion having on its lower face a molding recess adapted to cooperate with said first-named molding recess to mold a blank having the contour and thickness of the comb to be obtained, a gate leading into the recesses and said top portion having a plurality of slits registering with the slits of said bottom portion and parallel therewith; and a plurality of blades adapted to slide longitudinally through said slits and to extend across the recesses when the top and bottom mold portions are in contact to receive the plastic material forced into the recesses under pressure.

5. A molding device as claimed in claim 4, wherein the plane of the juncture of the bottom and top portions is coincident with the mean longitudinal plane of the comb to be obtained.

6. A molding device as claimed in claim 5, wherein the blades are movable transversely of and perpendicularly to the mean longitudinal plane of the comb to be obtained.

7. A molding device for the manufacture of combs from plastic materials and the like comprising in combination a fixed base; guiding means supported by said base; a bottom portion guided by said guiding means, said bottom portion having a molding recess on its upper face and a plurality of substantially parallel vertical slits opened at both ends; spring means to elastically support said bottom on said base; a top portion guided by said guiding means and adapted to be pressed on said bottom portion, said top portion having on its lower face a molding recess adapted to cooperate with said first-named molding recess to mold a blank having the contour and thickness of the comb to be obtained and said top portion having a plurality of blind slits registering with the slits of said bottom portion and parallel therewith; a gate leading into the recesses and a plurality of vertical blades fixed to said base, said blades being adapted to de longitudinally through said slits, and to extend across the recesses when the top and bottom portions are in contact to receive the plastic material forced into said recesses under pressure, and said blades being so proportioned as not to project within the recess of said bottom portion when the latter is not lowered by the pressure of said top portion against the action of said spring means.

8. In a molding device as claimed in claim 7, the surface of said bottom and top portions between the successive slits being concave in cross-section.

9. A mold for a comb comprising independently slidable top and bottom members having opposed complementary recesses conforming to the shape of a comb and its teeth, a gate connecting with said recesses and through which plastic material is fed, transverse slits in the mold members between the portions of the recesses conforming to the teeth of the comb, and fixed blades completely occupying the slits when the members are slid into closed position preliminary to the introduction of the plastic material.

LUCIEN MAZZONI.